May 12, 1931.  J. A. PICKARD  1,804,512
FILTER
Filed Nov. 12, 1928   3 Sheets-Sheet 1

INVENTOR
J. A. Pickard
BY
Langner, Parry, Card & Langner
ATTORNEYS

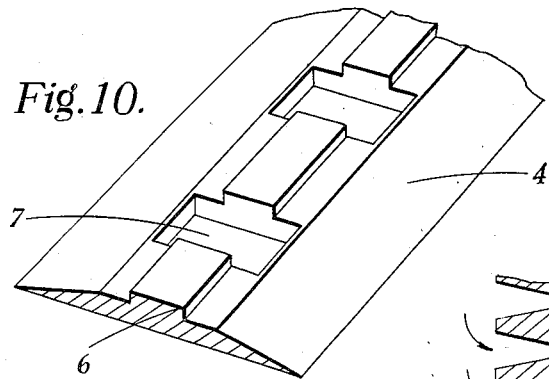
Fig.10.
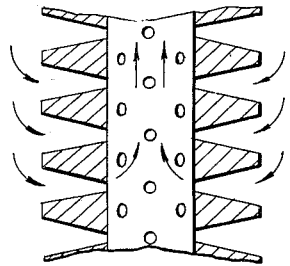
Fig.15.
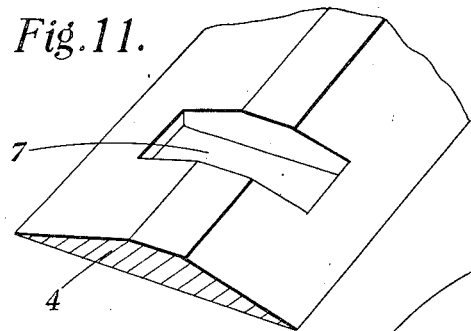
Fig.11.
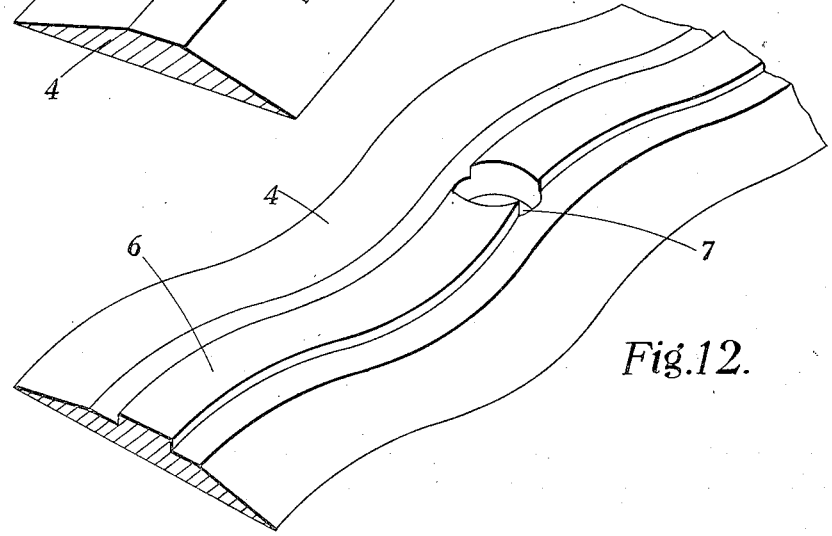
Fig.12.
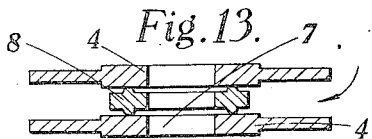
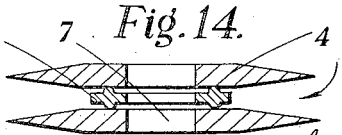
Fig.13.  Fig.14.

Patented May 12, 1931

1,804,512

UNITED STATES PATENT OFFICE

JOSEPH ALLEN PICKARD, OF ACTON, LONDON, ENGLAND, ASSIGNOR TO METAFILTERS LIMITED, OF LONDON, ENGLAND, A BRITISH COMPANY

FILTER

Application filed November 12, 1928, Serial No. 318,854, and in Great Britain December 2, 1927.

This invention relates to filters and has particular reference to filters composed of filter elements of non-fibrous material such as metal.

Filters of fibrous or porous material are very effective for a time but present the serious disadvantage that when they become choked or exhausted it is a troublesome matter to clean or revive them or renew their working parts. On the other hand so-called edge filters which present fine slits or edges between non-porous or non-fibrous elements for the free flow of liquid, but the retention of suspended particles at the said slits or edges are liable to become clogged and therefore inefficient somewhat rapidly and in consequence they need to be cleaned or taken apart very frequently. Moreover on account of the relatively long or extensive capillary spaces which exist in edge-filters as hitherto made, an internal choking of these spaces is very liable to occur as well as choking at the entering edges.

The chief object of the present invention is to provide an improved form of filter of the non-fibrous kind enabling filtration to be carried out a large number of times successively in the same filter and over long periods without appreciable or progressive loss of efficiency either in clarity or output and permitting a revival or cleansing to be rapidly and simply effected between operations when required. A further object is to enable finely divided material generally termed filter-aids to be employed in a particularly effective manner as will hereinafter appear.

With the above objects in view the present invention in its broad aspect may be regarded as consisting in a filter which presents to the material to be filtered a number of passages having a cross-sectional area which diminishes gradually or in stages in the direction of flow to a minimum corresponding to the desired width or size of slit or gap for the final escape of the filtered liquid.

The uniformly or stepped tapering passages may be obtained mainly as the result of a particular shape or configuration of the filter elements or mainly as a result of their mode of assembly with respect to one another.

In the case for example of a filter composed of an assembly of annular plates between which the material to be filtered flows from the peripheral inter-spaces towards the central space they may have a uniformly or stepped tapering peripheral zone and a flat central zone, and may be spaced at a predetermined extent from one another by ribs or studs or similar facial protuberances or by separate spacing elements. In the case of a filter composed of a pile or assembly of rectangular strips, the edges may similarly be tapered and the spacing may be effected by longitudinal or transverse ribs or the like.

The feature of filter passages of diminishing cross-sectional area in the direction of flow as above described enables filter aid to be employed in conjunction with the filters in a particularly effective manner as the shape of the passages causes the filter aid accumulated therein to become firmly keyed or held in position whilst at the same time ensuring that it may be very readily removed therefrom as and when required by a mere reversal of flow. Filter aid deposited in this manner is termed a filter bed or pervium.

As will be understood the constructions of filters above described are only some of the possible embodiments of the invention, which will now be described more fully with reference to the accompanying drawings in which:—

Figures 10, 11 and 12 are sectional perspective views of further forms of the filter element.

Figures 13 and 14 are cross-sectional views of filter assemblies in which the spacing is effected by intermediate members as hereinafter described.

Figure 15 is a vertical section of two plates formed with conical holes and operating as filter elements in accordance with the present invention.

Figure 1:
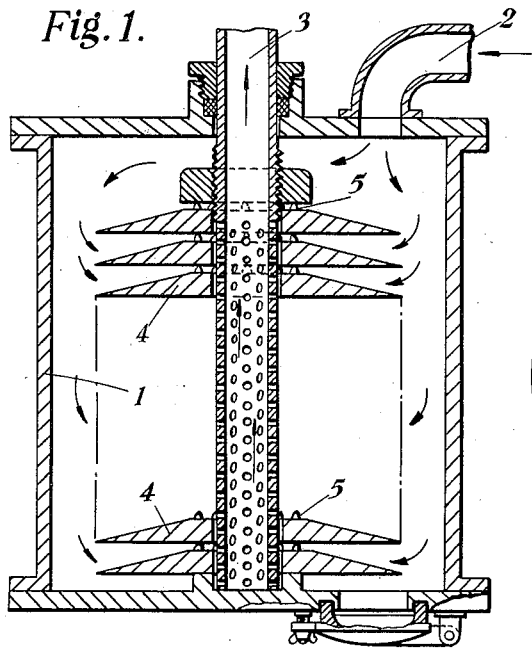
Figure 1 is a vertical section of a simple form of filter in which are incorporated a pile of filter elements in accordance with the invention.
Figure 2:
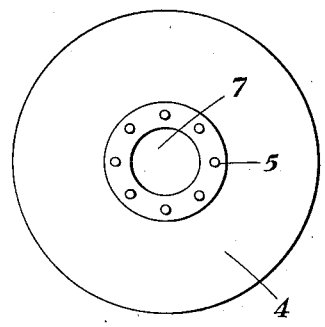
Figure 2 is a plan view and Figure 3 a sectional perspective view of different forms of the filter elements shown in Figure 1, and Figures 4, 5 and 6 are cross-sectional views of slight modifications thereof.
Figure 3:
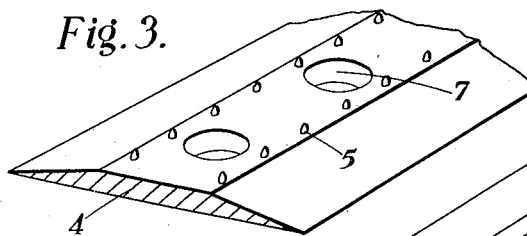
Figure 4:
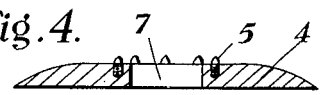
Figure 5:
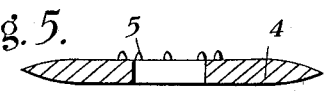
Figure 6:
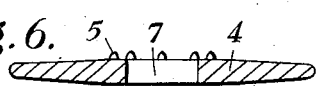

Referring first more particularly to the simple form of filter illustrated in Figure 1, it is seen to comprise a vessel 1 having an inlet pipe 2 and an outlet pipe 3, the latter being in the form of a perforated tube mounted centrally in the vessel and carrying a pile of metal plates 4 constituting the filter elements. The plates 4 are tapered towards their edge to form tapering passages which diminish gradually in the direction of flow of the liquid to be filtered. These plates may be of any convenient shape as for example annular as shown in Figure 2 or rectangular as shown in Figure 3. Their taper may be on one face only as shown in Figures 1 to 4 and flat as shown in Figures 1 to 3 or curved as shown in Figure 4 or tapered on both faces as shown in Figures 5 and 6 and their actual edge may be sharp as shown in Figures 1 to 5 or rounded as shown in Figure 6.

Figure 7:
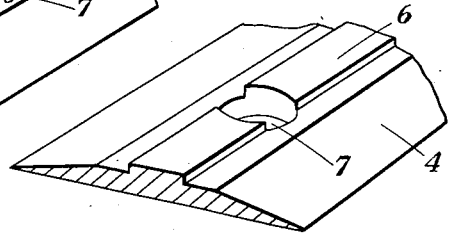
Figure 7 is a sectional perspective view of another form of filter element in accordance with the invention.
Figure 8:
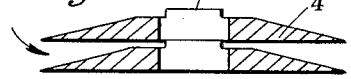
Figures 8 and 9 are cross-sectional views of slight modifications thereof.
Figure 9:
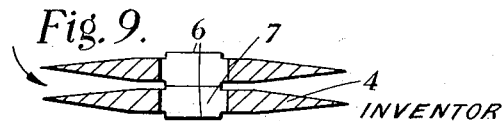

The spacing of the elements may be effected in any convenient way as by protuberances 5 as shown in Figures 1 to 3 or by radial ribs or otherwise. A spacing by means of a longitudinal rib 6 on one face of a rectangular filter element is shown in Figures 7 and 8 and by a rib on each face in Figure 9. The outlet channel or channels 7 for the filtered liquid may be round as in Figures 1 to 9 or rectangular as shown in Figures 10 and 11. In Figure 11 there is no actual rib and the outlet channel 7 extends laterally into the tapering portions of the element.

Figure 12 shows a ribbed filter element of undulatory strip form the advantage of this being that when a pile of such elements is unclamped they will tend to spring apart and thereby assist in the removal of solids retained in the filter.

Figure 13 illustrates filter elements in which the tapering of the filter passages is of stepped form and in which the spacing is obtained by an intermediate element 8. In Figure 14 the elements have tapered edges but the spacing is by means of the intermediate element 8.

Figure 16:
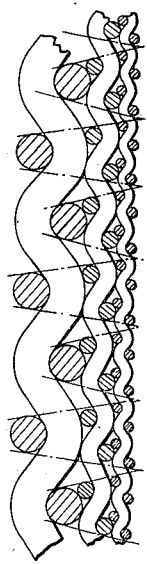
Figure 16 represents a modification thereof in which the filter wall is composed of an assembly of sheets of wire gauze of graduated mesh.

Figures 15 and 16 illustrate filter elements in which the filter passages are tapering holes. In Figure 15 the passages are shown as plain conical holes in a metal tube and in Figure 16 they are built-up tapering holes resulting from the assembly of three sheets of metal gauze of different coarseness of wire and mesh.

Figure 17:
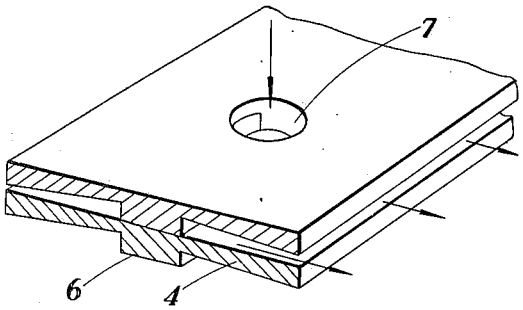
Figure 17 is a cross-sectional elevation of a further form of the filter elements.

Figure 17 illustrates a modification in which the tapering of the elements is somewhat the reverse of that shown in the preceding figures, this modification being suited to flow of material from the central passage towards the edges instead of vice versa.

Figure 18:
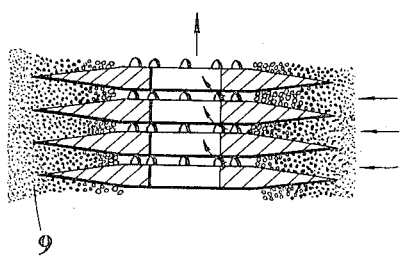
Figure 18 is a fragmentary sectional view of filter elements in accordance with the present invention in conjunction with a mass of filter aid keyed or held thereon.
Figure 19:
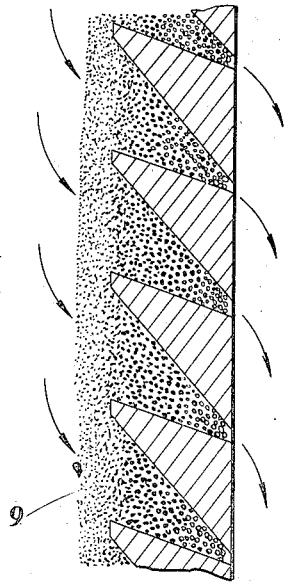
Figure 19 is a sectional view of another form of filter element in accordance with the present invention and well adapted to support the mass of filter aid shown.

Figures 18 and 19 illustrate two constructions and arrangements of filter elements in accordance with the present invention and with which filter aid 9 has been associated, it being clearly seen that the filter aid is well keyed or wedged in place against and between the filter elements. This keying or wedging effect is sufficient to provide support for a substantial bed of filter aid and to prevent its spontaneous detachment during filtration or when idle even in a vertical or inclined or inverted position and to require an appreciable force to dislodge the filter bed such as that obtainable by reverse flow or by impingement of jets of liquid.

The filters are fully effective in clarifying fluids such for example as beer for bottling, varnish, oils and so forth either at ordinary or at elevated temperatures. The output of the filters is highly satisfactory as regards both quantity of liquid clarified in a given time and as regards quality. Beer for example can be rendered entirely free from yeast cells and bacteria and will remain bright and clear for many weeks without throwing any deposit. Similarly low grade varnish may be converted into varnish of clear useful quality.

The filtration may be effected under considerable pressure without harmful effects on the filter or difficultly in eventual cleaning. In some cases the filter can be cleaned or flushed with suitable solvents or steam instead of with water.

What I claim is:—

1. A filter of the multi-plate type comprising a vessel, an inlet thereto, an outlet therefrom, a pile of plates having substantially impermeable surfaces, each plate comprising a flat-faced central portion having a central aperture therethrough, a tapering edge portion extending from said central portion, and spaced protuberances of predetermined size on the flat-faced central portion adjacent the central aperture whereby the distance apart of the adjacent faces of the adjacent plates is predetermined, and means for retaining the plates assembled with their central apertures aligned, said aligned apertures being in communication with the vessel outlet.

2. A filter of the multi-plate type comprising a vessel, an inlet thereto, and outlet therefrom, a pile of circular plates having substantially impermeable surfaces, each comprising a flat-faced central portion having an axial aperture therethrough, an annular portion tapering from said central portion to the periphery, and a group of protuberances of predetermined size on the central portion spaced around the central aperture and closely adjacent thereto, and means for retaining the circular plates assembled with their axial apertures aligned, said aligned apertures being in aligned communication with the vessel outlet.

3. A filter of the multi-plate type comprising a vessel, an inlet thereto, an outlet therefrom, a pile of plates having substantially rigid and impermeable surfaces and each comprising a flat-faced central portion having a central aperture therethrough, a tapering edge portion extending from said central portion, and a group of protuberances of predetermined size located on the central portion adjacent to the central aperture to uniformly space apart the adjacent faces of adjacent plates, and means for retaining the plates assembled with their central apertures aligned, said aligned apertures being in communication with the vessel outlet.

In testimony whereof I have signed my name to this specification.

JOSEPH ALLEN PICKARD.